United States Patent
Clavette et al.

(10) Patent No.: US 11,397,062 B2
(45) Date of Patent: Jul. 26, 2022

(54) SELF-SUPPORTING ADDITIVELY-MANUFACTURED HEAT EXCHANGER HEADER

(71) Applicant: Hamilton Sundstrand Corporation, Charlotte, NC (US)

(72) Inventors: Jeremy Clavette, West Hartford, CT (US); Joshua M. Norman, South Windsor, CT (US); Raffi O. Mangoyan, Manchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 236 days.

(21) Appl. No.: 16/684,464

(22) Filed: Nov. 14, 2019

(65) Prior Publication Data

US 2021/0148655 A1    May 20, 2021

(51) Int. Cl.
| | |
|---|---|
| *B33Y 80/00* | (2015.01) |
| *F28F 9/02* | (2006.01) |
| *B33Y 10/00* | (2015.01) |
| *B33Y 70/00* | (2020.01) |
| *B22F 10/00* | (2021.01) |

(52) U.S. Cl.
CPC ............ *F28F 9/0263* (2013.01); *B22F 10/00* (2021.01); *B33Y 10/00* (2014.12); *B33Y 70/00* (2014.12); *B33Y 80/00* (2014.12); *F28F 2009/0297* (2013.01)

(58) Field of Classification Search
CPC ............ F28F 9/0263; F28F 2009/0297; F28F 9/0224; F28F 2009/0292; F28F 2225/08; F28F 9/02; B33Y 10/00; B33Y 70/00; B33Y 80/00; B22F 10/00; B22F 2999/00; B22F 10/47; B22F 5/10; B22F 10/28; Y02P 10/25

See application file for complete search history.

(56) References Cited

U.S. PATENT DOCUMENTS

| | | |
|---|---|---|
| 9,976,815 B1 | 5/2018 | Roper et al. |
| 10,089,416 B1 | 10/2018 | DuBose et al. |

(Continued)

FOREIGN PATENT DOCUMENTS

WO     2017179587 A1    10/2017

OTHER PUBLICATIONS

European Search Report dated Feb. 25, 2021, received for corresponding European Application No. 20207805.1 6 pages.

*Primary Examiner* — Lawrence Averick
(74) *Attorney, Agent, or Firm* — Kinney & Lange, P.A.

(57) ABSTRACT

An additively-manufactured heat exchanger header defines a build plane and a vertical axis defining a build direction that is orthogonal to the build plane. The additively-manufactured heat exchanger header includes a header body that at least partially contains a working fluid, and an upper support structure on the header body. The upper support structure defines an interior edge and includes a branchwork of gussets rising upward and outward from a root point located in the middle region on the header body. The header body defines a middle region, an upper region, and a top extension. The branchwork of gussets forms a number of top vanes, each supporting the top extension. The upper region is oriented over the middle region relative to the vertical axis, and the top extension partially defines the fluid boundary and is oriented over the upper region.

12 Claims, 3 Drawing Sheets

(56) References Cited

U.S. PATENT DOCUMENTS

| | | | |
|---|---|---|---|
| 10,371,462 B2 | 8/2019 | Vos et al. | |
| 2003/0217838 A1* | 11/2003 | Dey | F28F 9/0246 |
| | | | 165/173 |
| 2010/0032149 A1* | 2/2010 | Roll | F28F 9/02 |
| | | | 165/175 |
| 2010/0300664 A1* | 12/2010 | Kang | F28D 1/05383 |
| | | | 165/157 |
| 2011/0272122 A1* | 11/2011 | Corbeil | F28F 21/089 |
| | | | 165/133 |
| 2013/0236299 A1* | 9/2013 | Kington | F02C 7/08 |
| | | | 415/177 |
| 2017/0089643 A1* | 3/2017 | Arafat | F28D 9/0093 |
| 2017/0146305 A1 | 5/2017 | Kuczek et al. | |
| 2017/0248372 A1* | 8/2017 | Erno | F28F 9/02 |
| 2017/0292791 A1* | 10/2017 | Zaffetti | F28F 7/02 |
| 2017/0356698 A1 | 12/2017 | Andersen et al. | |
| 2018/0045471 A1* | 2/2018 | Dietrich | B33Y 80/00 |
| 2018/0345425 A1 | 12/2018 | Caimano et al. | |
| 2019/0086154 A1 | 3/2019 | Adriany et al. | |
| 2019/0285364 A1* | 9/2019 | Streeter | B22F 7/062 |
| 2021/0333056 A1* | 10/2021 | Butcka | B33Y 10/00 |

* cited by examiner

SELF-SUPPORTING ADDITIVELY-MANUFACTURED HEAT EXCHANGER HEADER

BACKGROUND

The present disclosure relates to heat exchangers, and more particularly, to a self-supporting additively-manufactured heat exchanger header that improves the manufacturability and performance of the heat exchanger.

Heat exchangers are well known in the aviation arts and in other industries for providing a compact, low-weight, and highly-effective means of exchanging heat from a hot fluid to a cold fluid. Heat exchangers that operate at elevated temperatures often have short service lives and/or require increased maintenance as a result of high cyclic thermal stress. The stress is caused by multiple system and component factors including rapid flow and/or temperature transients, geometric discontinuities, stiffness discontinuities, mass discontinuities, and materials of construction. For example, inlet and outlet headers are typically pressure vessels that are welded or bolted to a heat exchanger core or matrix. Pressure requirements dictate the thickness of these manifolds, sometimes resulting in a relatively thick header attached to a thinner core matrix. This mismatch in thickness and mass, while acceptable for pressure loads, conflicts with the goal of avoiding discontinuities to limit thermal stress.

Additive manufacturing can be used to build a heat exchanger core and headers as an integral unit, thereby overcoming some of aforementioned disadvantages. Moreover, the need to metallurgically attach headers to a heat exchanger core is avoided, thereby avoiding several possible disadvantages that can be associated with welding or brazing processes. In a typical additive manufacturing process, an integral heat exchanger core and header can be built up layer-by-layer against the direction of gravity. While many areas of a heat exchanger and header can be readily fabricated using additive manufacturing techniques, difficulty can occur in building the upper region of the headers, where an overhang must be fashioned. Massive internal support structures can be provided for additively-manufacturing the overhang, resulting in fluid flow restrictions, increased mass and the associated mass discontinuities, geometric discontinuities, and stiffness discontinuities. Accordingly, there is a need for a self-supporting additively-manufactured heat exchanger header that overcomes these disadvantages.

SUMMARY

An additively-manufactured heat exchanger header defines a build plane and a vertical axis defining a build direction that is orthogonal to the build plane. The additively-manufactured heat exchanger header includes a header body configured to at least partially contain a working fluid and an upper support structure on the header body. The upper support structure defines an interior edge and includes a branchwork of gussets rising upward and outward from a root point located in the middle region on the header body. The header body defines a middle region, an upper region, and a top extension. The branchwork of gussets forms a number of top vanes, each supporting the top extension. The upper region is oriented over the middle region relative to the vertical axis, and the top extension partially defines the fluid boundary and is oriented over the upper region.

A method of using laser powder bed fusion (LPBF) to build a heat exchanger header defining a build plane and a vertical axis defining a build direction that is orthogonal to the build plane. The method includes building a header body configured to at least partially contain a working fluid, the header body defining a middle region, an upper region oriented over the middle region relative to the vertical axis, and a top extension that partially defines the fluid boundary and is oriented over the upper region, and building an upper support structure on the header body. The upper support structure includes a branchwork of gussets rising upward and outward from a root point located in the middle region on the header body, the branchwork of gussets forming a number of top vanes, each supporting the top extension. The header body and the upper support structure are built concurrently in the build direction.

DETAILED DESCRIPTION

The present disclosure is directed to an additively-manufactured heat exchanger header having a self-supporting design. For the sake of illustrating and describing the present disclosure, a self-supporting header is shown in an exemplary embodiment on a hot circuit of a heat exchanger core. Accordingly, the hot circuit of a heat exchanger is disclosed. It is to be appreciated that a heat exchanger utilizing the self-supporting header of the present embodiment also includes a cold circuit. In some embodiments, the cold circuit can also include inlet and outlet headers that can be similar to the self-supporting header of the present disclosure.

Figure 1:
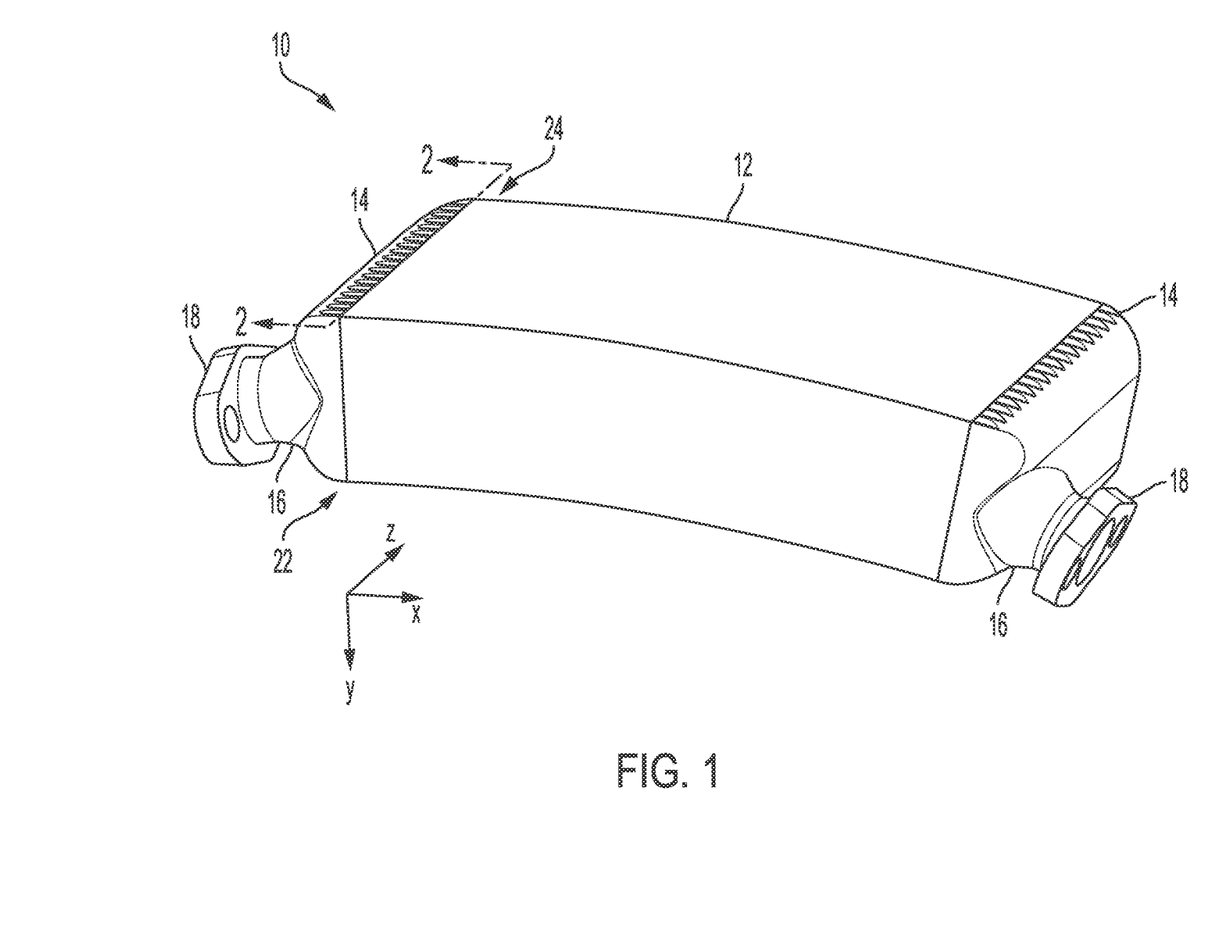
FIG. 1 is a perspective view of an additively-manufactured heat exchanger.

FIG. 1 is a perspective view of an additively-manufactured heat exchanger. Shown in FIG. 1 are heat exchanger 10, core 12, headers 14, nozzles 16, and flanges 18. The x-y-z coordinate axes are also labeled in FIG. 1, with the x-y axes defining the additive-manufacturing (AM) build plane, and the z axis defining the additive-manufacturing build direction. During an additive-manufacturing process the build direction is upward, against gravity. Therefore, heat exchanger 10 depicted in FIG. 1 has been rotated 90 degrees following its manufacture (i.e., the z axis, in reference to heat exchanger 10, is oriented approximately in the horizontal direction as shown in FIG. 1). Heat exchanger 10 includes core 12 which transfers heat from one fluid to another while maintaining a fluid separation between the two fluid circuits. Heat will generally flow from the hot fluid to the cold fluid across the various components within core 12. Therefore, as used in this disclosure, "hot" will be used to describe the first fluid circuit and "cold" will be used to describe the second fluid circuit. The terms "hot" and "cold" are relative one to the other. As used in different embodiments, heat exchanger 10 can encounter temperatures ranging from near absolute zero (for example, in cryogenic distillation) to 1,000 deg. F. (538 deg. C.) or more (for example, in gas turbine engine systems and related components). Moreover, "hot" and "cold" are used in this disclosure as descriptive terms to refer to the various components that are associated with the respective first and second fluid circuits in the heat exchanger core, without implying that particular temperatures or a temperature relationship exists for those components during the manufacturing process of the heat exchanger core.

During operation of heat exchanger 10, a hot fluid flows into and out of core 12 via headers 14, each having an associated nozzle 16 that terminates at a flange 18. Accordingly, flanges 18 can be connected to other fluid circuit components (not shown) to channel the hot fluid into and out of heat exchanger 10. The hot and cold fluids can each be referred to as working fluids. Moreover, the hot fluid can be referred to as a first fluid, and the cold fluid can be referred to as a second fluid. Headers 14 can be referred to as additively-manufactured headers. Headers 14 can also be referred to as manifolds or as plenums. In the illustrated embodiment, heat exchanger 10 (i.e., including core 12, headers 14, nozzles 16, and flanges 18) is built as an integrated component using an additive-manufacturing process. Laser powder bed fusion (LPBF) is a non-limiting exemplary additive-manufacturing process that can be used to manufacture heat exchanger 10. Several advantages can result from additively-manufacturing heat exchanger 10 as an integral unit, including the avoidance of having to metallurgically attach separate headers onto a core, with resulting heat affected zones and mass discontinuities. Additive manufacturing also allows for more intricate features to be built into heat exchanger 10, which can improve the thermal and/or hydrodynamic performance. However, as noted above, challenges in forming horizontal overhang structures must be overcome. As will be seen in FIG. 2, the present disclosure eliminates the need to create a massive internal support structure underlying the overhang regions of an additively-manufactured header, thereby avoiding the associated restrictions to fluid flow, increased mass and associated mass discontinuities, geometric discontinuities, and stiffness discontinuities.

Figure 2:
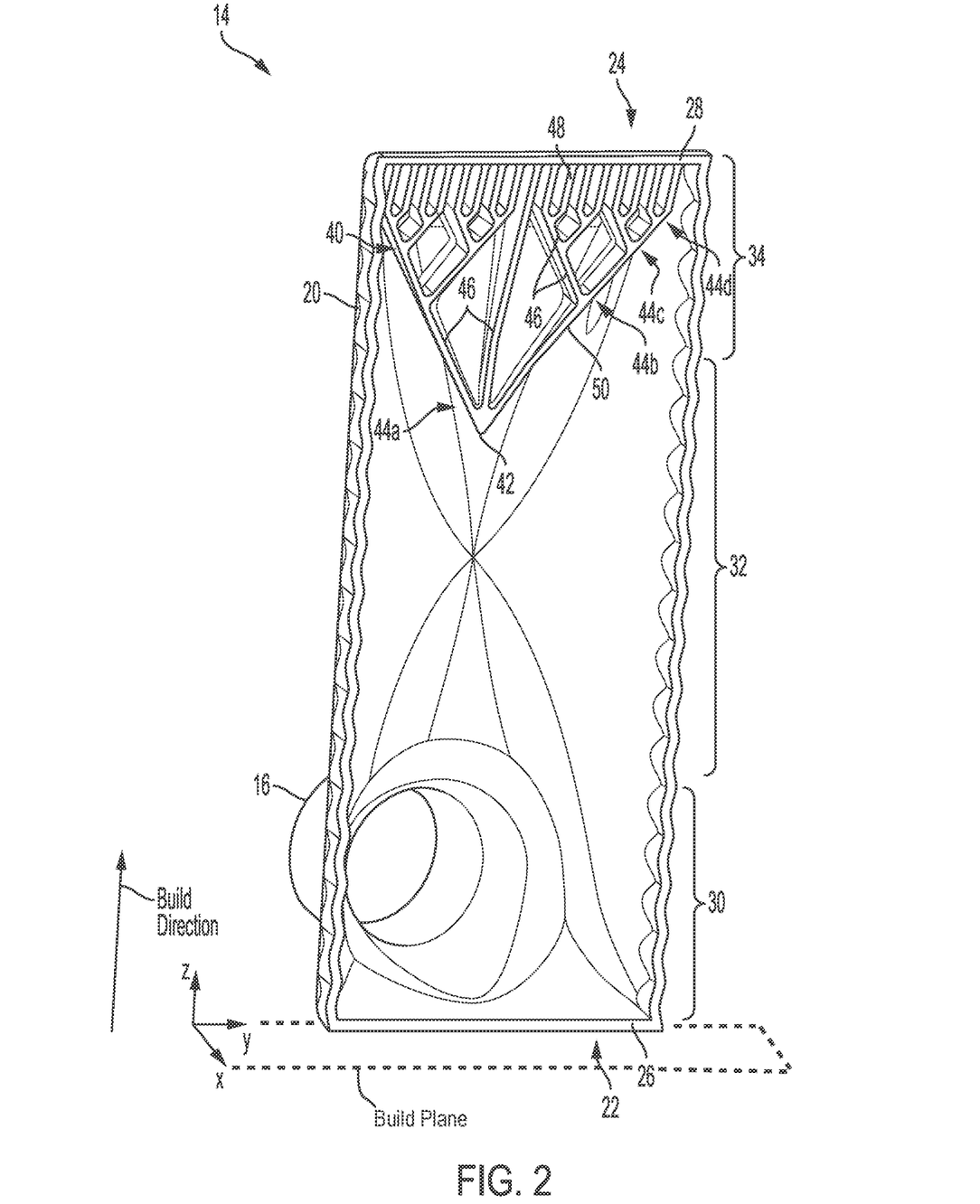
FIG. 2 is a perspective view showing the internal structure of an additively-manufactured header shown in FIG. 1.

FIG. 2 is a perspective view showing the internal structure of header 14 shown in FIG. 1. Shown in FIG. 2 are header 14, nozzle 16, body 20, bottom 22, top 24, bottom extension 26, top extension 28, lower region 30, middle region 32, upper region 34, upper support structure 40, root point 42, branches 44a, 44b, 44c, 44d (collectively, branches 44), gussets 46, top vanes 48, and interior edge 50. Header 14 can be either header 14 shown on heat exchanger 10 in FIG. 1. For ease of illustration, flange 18 is not shown on nozzle 16 in FIG. 2. The x-y-z coordinate axes and the build direction are also labeled in FIG. 2, with the x-y axes defining the additive manufacturing build plane and the z axis defining the build direction. Body 20 describes the outer structure of header 14 (i.e., not including upper support structure 40), thereby providing the pressure boundary when containing a working fluid (e.g., hot fluid). During an additive-manufacturing process, the build direction is upward against gravity (i.e., in the direction of the z axis), as described above in regard to FIG. 1. Accordingly, the build direction proceeds from bottom 22 to top 24, beginning with bottom extension 26 and ending with top extension 28. Top extension 28 can be described as an overhang structure, having a substantially horizontal orientation with respect to gravity (i.e., the z axis). Three regions can be defined on body 20: lower region 30, middle region 32, and upper region 34, as shown in FIG. 2. It is known in the additive-manufacturing art that unsupported overhang structures are difficult to manufacture, and can result in sagging, dropout, and/or failure if an adequate underlying support structure is not provided. However, an additive manufacturing process readily lends itself to the fabrication of horizontal, vertical, and near-vertical structures. Accordingly, the portions of header 14 in lower region 30 and middle region 32 can be fabricated using known means. However, the fabrication of top extension 28 (i.e., near top 24, in upper region 34), requires an underlying support structure. Upper support structure 40 provides a necessary supporting structure for top extension 28, as will be described, while adding minimal mass to header 14.

Upper support structure 40 begins at root point 42 in middle region 32 on body 20, forming a branchwork of gussets 46 that grow upward and outward during the fabrication process. Branches 44 describe the points where two or more gussets 46 emerge from a starting point. In the embodiment shown in FIG. 2, three gussets 46 rise upward from root point 42, diverging at branch 44a. Accordingly, branch 44a can be referred to as a first generation branch. Similarly, branches 44b can be referred to as second generation branches, branches 44c can be referred to as third generation branches, and branches 44d can be referred to as fourth generation branches. In the illustrated embodiment, branches 44d are the final generation of branches 44. Top vanes 48 are the final generation of gussets 46 that grow upward from the final generation of branches 44 (i.e., branches 44d), thereby supporting top extension 28. Gussets 46 and top vanes 48 form interior edge 50, which will be shown and described in greater detail later, in FIG. 4. Additional details of upper support structure 40 will be shown and described later, in FIGS. 3A-3B. Header 14 (i.e., manifold, plenum) can be modeled as a pressure vessel. As used in different embodiments, heat exchanger 10 can encounter pressures ranging from about 1 Atm. (14.7 psi, 101 kPa) up to 100 Atm. (1,470 psi, 10,100 kPa) or more. Accordingly, particularly in applications involving greater pressures, header 14 can be subjected to relatively high values of pressure force (i.e., pressure acting over a surface area thereupon applied), which can cause associated high values of associated tensile stress throughout header 14. Upper support structure 40 also provides reinforcement of header 14, thereby allowing header 14 to accommodate a higher working pressure without increasing the overall thickness of header 14. Therefore, header 14 can be referred to as a self-supporting additively-manufactured heat exchanger header or as a self-supporting reinforced additively-manufactured heat exchanger header. In some embodiments, upper support structure provides stiffening of header 14 thereby improving the structural performance of header 14. Non-limiting examples of improved structural performance include improved performance during hydraulic and/or temperature transients, and dampening of flow-induced resonance.

Middle region 32 is defined as being the region on body 20 where root point 42 begins, such that upper support structure 40 grows into upper region 34 to support top extension 28. The relative dimensions of lower, middle, and upper regions 30, 32, 34 can differ in various embodiments. In some embodiments, lower region 30 can be excluded so that root point 42 begins at or near bottom extension 26. Accordingly, in these embodiments, upper support structure can cover most or all of body 20.

In the embodiment shown in FIG. 2, four generations of branches 44 are used to define the network of top vanes 48 that supports top extension 28. In some embodiments, fewer than four generations of branches 44 can be used. In other embodiments, five or more generations of branches 44 can be used. In the embodiment shown in FIG. 2, upper support structure 40 grows from a single root point 42. In some embodiments, two or more root points 42 can be used, each supporting an upper support structure 40 that grows upward to a network of top vanes 48. Accordingly, in some embodiments, two or more networks of top vanes 48 can be used to support top extension 28. In the embodiment shown in FIG. 2, upper support structure 40 has left-right symmetry (i.e., relative to the z axis). In some embodiments, a non-symmetrical orientation of gussets 46 can be used to form upper support structure 40. Any of the aforementioned other variations and embodiments can be combined together in a particular embodiment. For example, in a particular embodiment, two or more upper support structures 40 can grow from an associated root point 42, each having a different number of generations of branches 44.

Figure 3A:
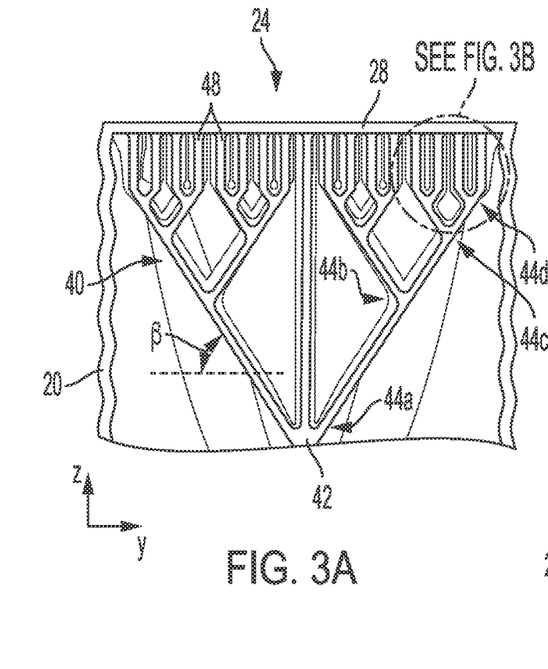
FIG. 3A is front view of the additively-manufactured self-supporting overhang structure shown in FIG. 2.
Figure 3B:
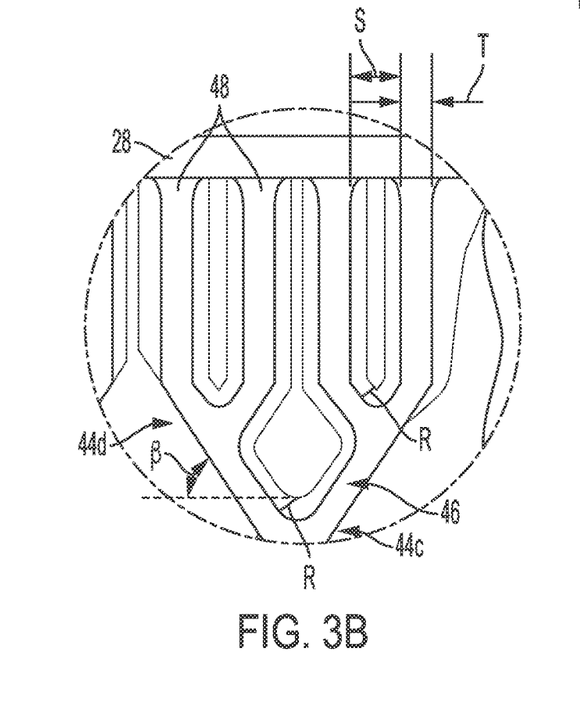
FIG. 3B is an enlargement showing detail of the ribs shown on FIG. 3A.

FIG. 3A is a front view of the additively-manufactured self-supporting overhang structure shown in FIG. 2. FIG. 3B is an enlargement showing detail of the ribs shown on FIG. 3A. Shown in FIGS. 3A-3B are body 20, top 24, top extension 28, upper support structure 40, root point 42, branches 44a, 44b, 44c, 44d, gussets 46, and top vanes 48. The y-z coordinate axis is labeled in FIG. 3A. The z axis can be referred to as the vertical axis, being aligned with the build direction. The x axis (not labeled in FIG. 3A) points out of the page. Branch radius R, vane spacing S, and vane thickness T are also labeled in FIG. 3B. Branch angle $\beta$ is labeled in FIGS. 3A-3B. The descriptions of body 20, top 24, top extension 28, upper support structure 40, root point 42, branches 44a, 44b, 44c, 44d, gussets 46, and top vanes 48 are substantially as provided above in regard to FIG. 2. Interior edge 50 (not labeled in FIGS. 3A-3B) will be shown and described in more detail later in FIG. 4. In the illustrated embodiment, top vanes 48 are each oriented vertically (i.e., parallel to the vertical axis). In some embodiments, the orientation of one or more top vanes 48 can be different than illustrated.

Referring again to FIGS. 3A-3B, branch angle $\beta$ describes the angle each branch 44 makes relative to the y axis (i.e., relative to the build plane). In the illustrated embodiment, branch angle $\beta$ is about 60 degrees, which allows for proper control of the additive manufacturing process in building upper support structure 40. Larger values of branch angle $\beta$ provide for greater control of the additive manufacturing process, however they cause root point 42 to shift downward (i.e., toward bottom 22 as shown in FIG. 2), thereby adding greater mass to upper support structure 40. Accordingly, the selection of branch angle $\beta$ can be made to optimize the balance between manufacturability and the overall size (i.e., mass) of upper support structure 40 for a particular additive manufacturing process, material selection, and design criteria for header 40. In some embodiments, branch angle $\beta$ can range from about 50-70 degrees. In other embodiments, branch angle $\beta$ can range from about 45-75 degrees. In yet other embodiments, branch angle $\beta$ can be greater than about 30 degrees, and can be as great as nearly 90 degrees. In some embodiments, branch angle $\beta$ can be less than 30 degrees. Accordingly, all values of branch angle $\beta$ are within the scope of the present disclosure. Moreover, different branches 44 can have values of branch angle $\beta$ that are different than others. As a non-limiting example, different branches 44 is a particular generation (e.g., branches 44a) can have different values of branch angle $\beta$. As another non-limiting example, the value of branch angle $\beta$ in one generation (e.g., branches 44b) can be different from the value of branch angle $\beta$ in another generation (e.g., branches 44c).

Referring again to FIGS. 3A-3B, each branch 44 has branch radius R, with labels being shown on branches 44c and 44d. Vane spacing S describes the opening between any two adjacent top vanes 48, and vane thickness T describes the thickness of any particular top vane 48. Branch radius R can also be referred to as the branch separation radius, and vane spacing S can also be referred to as the vane spacing interval. In the illustrated embodiment, of branch radius R helps reduce stress intensification that could otherwise occur at branches 44 (i.e., with sharp corners). Because header 14 (i.e., body 20) contains the system pressure of the working fluid, pressure stress can contribute to the stress intensification that can occur near branches 44. Moreover, temperature transients can cause thermal stress that can contribute to the stress intensification that can occur near branches 44. Uncontrolled stress intensification can result in fatigue of header 14, including body 20 and/or upper support structure 40, which can reduce the service life of heat exchanger 10. Accordingly, branch radius R can help mitigate the effect of pressure and thermal stress in header 14 from branches 44. Branch radius R can be expressed in terms of vane spacing S. In the illustrated embodiment, branch radius R is about 0.5 times vane spacing S. In some embodiments, branch radius R can range from about 0.2-0.5 times vane spacing S. In other embodiments, branch radius R can be less than 0.2 times vane spacing S. In the illustrated embodiment, vane spacing S is about 2 mm. In some embodiments, vane spacing S can range from about 1.5-3 mm. In other embodiments, vane spacing S can range from about 0.1-5 mm. In yet other embodiments, vane spacing S can be less than 0.1 mm or greater than 5 mm. In the illustrated embodiment, vane thickness T is about 1 mm. In some embodiments, vane thickness T can range from about 0.7-2 mm. In other embodiments, vane thickness T can range from about 0.5-5 mm. In yet other embodiments, vane thickness T can be less than 0.5 mm or greater than 5 mm.

The selection of values for branch radius R, vane spacing S, and vane thickness T can depend on several factors, with non-limiting examples including the material that header 14 is made of, the additive manufacturing process used to fabricate header 14, and the design pressure and temperature of header 14. In the illustrated embodiment, header 14 is made of a metallic material. Accordingly, the selection of vane spacing S and vane thickness T can provide an adequate heat sink for forming top extension 28 during the additive manufacturing process. Upper support structure 40 can also be referred to as a trimmed branch structure. A benefit of a trimmed branch structure can be to provide an adequate heat sink during a laser powder bed fusion build process while reducing or minimizing added mass. Because upper support structure 40 is integral to header 14, there is not a need to add a temporary support structure for the build process that is later removed. This can allow for building an entirely closed structure, for example, as shown in FIG. 1. Non-limiting examples of metallic materials that can be used include nickel, aluminum, titanium, copper, iron, steel, cobalt, and all alloys that include these various metals. In some embodiments, various alloys of INCONEL™ can be used, with Inconel 625 and Inconel 718 being two exemplary alloy formulations. In other embodiments, other nickel-based Superalloys can be used, with Haynes 282™ being an example. In yet other embodiments, alloys of aluminum can be used. For example, alloys of aluminum known as A205, A20X™ AlSi10Mg, and Aluminum 6061 can be used.

As shown and described above in regard to FIGS. 3A-3B, the branchwork of gussets 46 that form upper support structure 40 have open spaces between adjacent gussets 46. When a working fluid is flowing through header 14, a portion of the working fluid can flow along (i.e., through) the branchwork of gussets 46. Some of the working fluid flow can flow between adjacent top vanes 48. Accordingly, restrictions to fluid flow are reduced or avoided, and increased mass and associated mass discontinuities, geometric discontinuities, and stiffness discontinuities can also be reduced or avoided. Moreover, upper support structure 40 can guide the flow of the working fluid in header 14 in some embodiments.

Figure 4:
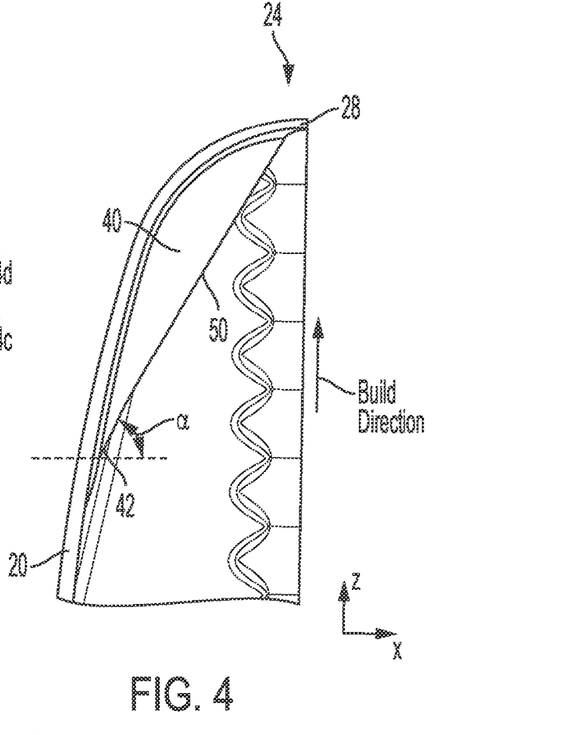
FIG. 4 is side view of the additively-manufactured self-supporting overhang structure shown in FIG. 2.

FIG. 4 is a side view of upper support structure 40 shown in FIG. 2. Shown in FIG. 4 are body 20, top 24, top extension 28, upper support structure 40, root point 42, and interior edge 50. The x-z coordinate axis is labeled in FIG. 4. Interior edge angle $\alpha$ is also labeled in FIG. 4. The descriptions of body 20, top 24, top extension 28, upper support structure 40, root point 42, and interior edge 50 are substantially as provided above in regard to FIG. 2. Interior edge angle $\alpha$ describes the angle interior edge 50 makes relative to the x axis (i.e., relative to the build plane). In the illustrated embodiment, interior edge angle $\alpha$ is about 60 degrees, which allows for proper control of the additive manufacturing process in building upper support structure 40. Larger values of interior edge angle $\alpha$ provide for greater control of the additive manufacturing process, however they cause root point 42 to shift downward (i.e., toward bottom 22 as shown in FIG. 2), thereby adding greater mass to upper support structure 40. Accordingly, the selection of interior edge angle $\alpha$ can be made to optimize the balance between manufacturability and the overall size (i.e., mass) of upper support structure 40 for a particular additive manufacturing process, material selection, and design criteria for header 40. In some embodiments, interior edge angle $\alpha$ can range from about 50-70 degrees. In other embodiments, interior edge angle $\alpha$ can range from about 45-75 degrees. In yet other embodiments, interior edge angle $\alpha$ can be greater than about 30 degrees, and can be as great as nearly 90 degrees. In some embodiments, interior edge angle $\alpha$ can be less than 30 degrees. Accordingly, all values of interior edge angle $\alpha$ are within the scope of the present disclosure.

DISCUSSION OF POSSIBLE EMBODIMENTS

The following are non-exclusive descriptions of possible embodiments of the present invention.

An additively-manufactured heat exchanger header defining a build plane and a vertical axis, the vertical axis being orthogonal to the build plane and defining a build direction, the additively-manufactured heat exchanger header comprising: a header body configured to at least partially contain a working fluid, the header body defining a middle region, an upper region, and a top extension; wherein: the upper region is oriented over the middle region relative to the vertical axis; and the top extension partially defines the fluid boundary and is oriented over the upper region; and an upper support structure disposed on the header body, the upper support structure comprising a branchwork of gussets rising upward and outward from a root point disposed in the middle region on the header body, the branchwork of gussets forming a plurality of top vanes, each supporting the top extension, the upper support structure defining an interior edge.

The additively-manufactured heat exchanger header of the preceding paragraph can optionally include, additionally and/or alternatively, any one or more of the following features, configurations and/or additional components:

A further embodiment of the foregoing additively-manufactured heat exchanger header, wherein: the interior edge defines an interior edge angle relative to the build plane; the interior edge angle is greater than 30 degrees; the branchwork of gussets comprises a plurality of branches; each of the plurality of branches defines a branch angle; and the branch angle is greater than 30 degrees.

A further embodiment of the foregoing additively-manufactured heat exchanger header, wherein: the interior edge angle is between 45-75 degrees; and the branch angle is between 45-75 degrees.

A further embodiment of the foregoing additively-manufactured heat exchanger header, wherein: each of the plurality of top vanes defines a vane thickness; and the vane thickness is between 0.5-5 mm.

A further embodiment of the foregoing additively-manufactured heat exchanger header, wherein: two adjacent top vanes defines a vane spacing interval; and the vane spacing interval is between 0.1-5 mm.

A further embodiment of the foregoing additively-manufactured heat exchanger header, wherein: each of the plurality of top vanes defines a vane thickness; the vane thickness is between 0.7-2 mm; and the vane spacing interval is between 1.5-3 mm.

A further embodiment of the foregoing additively-manufactured heat exchanger header, wherein the plurality of top vanes is configured to provide a heat sink for the top extension during an additive manufacturing process.

A further embodiment of the foregoing additively-manufactured heat exchanger header, wherein each of the plurality of top vanes is parallel to the vertical axis.

A further embodiment of the foregoing additively-manufactured heat exchanger header, wherein: the branchwork of gussets comprises a plurality of branches; two adjacent branches define a branch separation radius; and the branch separation radius is between 0.2-0.5 times the vane spacing interval.

A further embodiment of the foregoing additively-manufactured heat exchanger header, comprising nickel, aluminum, titanium, copper, iron, cobalt, and/or alloys thereof.

A further embodiment of the foregoing additively-manufactured heat exchanger header, comprising Inconel 625, Inconel 718, Haynes 282™, A205, A20X™, AlSi10Mg, or Aluminum 6061.

A further embodiment of the foregoing additively-manufactured heat exchanger header, wherein the branchwork of gussets comprises three or more generations of branches.

A further embodiment of the foregoing additively-manufactured heat exchanger header, further comprising: a bottom extension; and a lower region; wherein: the lower region is oriented under the middle region relative to the vertical axis; the bottom extension is oriented under the lower region; and the bottom extension partially defines the fluid boundary.

A further embodiment of the foregoing additively-manufactured heat exchanger header, further comprising one or more flow nozzles disposed on the header body, each of the one or more flow nozzles configured to port a working fluid into and/or out of the additively-manufactured heat exchanger header.

A heat exchanger comprising the foregoing additively-manufactured heat exchanger header, wherein the heat exchanger is configured to: port a first fluid and a second fluid through the heat exchanger while maintaining isolation of the first fluid from the second fluid; and transfer heat between the first fluid and the second fluid.

A method of using laser powder bed fusion (LPBF) to build a heat exchanger header defining a build plane and a vertical axis, the vertical axis being orthogonal to the build plane and defining a build direction, the method comprising:

building a header body configured to at least partially contain a working fluid, the header body defining a middle region, an upper region, and a top extension; wherein: the upper region is oriented over the middle region relative to the vertical axis; and the top extension partially defines the fluid boundary and is oriented over the upper region; and building an upper support structure on the header body, the upper support structure comprising a branchwork of gussets rising upward and outward from a root point disposed in the middle region on the header body, the branchwork of gussets forming a plurality of top vanes, each supporting the top extension, the upper support structure defining an interior edge; wherein the header body and the upper support structure are built concurrently in the build direction.

The method of the preceding paragraph can optionally include, additionally and/or alternatively, any one or more of the following features, configurations and/or additional components:

A further embodiment of the foregoing method, wherein: the interior edge defines an interior edge angle relative to the build plane; the interior edge angle is greater than 30 degrees; the branchwork of gussets comprises a plurality of branches; each of the plurality of branches defines a branch angle; and the branch angle is greater than 30 degrees.

A further embodiment of the foregoing method, wherein: the interior edge angle is between 45-75 degrees; and the branch angle is between 45-75 degrees.

A further embodiment of the foregoing method, wherein: each of the plurality of top vanes defines a vane thickness; the vane thickness is between 0.5-5 mm; two adjacent top vanes defines a vane spacing interval; and the vane spacing interval is between 0.1-5 mm.

A further embodiment of the foregoing method, wherein: the branchwork of gussets comprises a plurality of branches; two adjacent branches define a branch separation radius; and the branch separation radius is between 0.2-0.5 times the vane spacing interval.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An additively-manufactured heat exchanger header defining a build plane and a vertical axis, the vertical axis being orthogonal to the build plane and defining a build direction, the additively-manufactured heat exchanger header comprising:
   a header body configured to at least partially contain a working fluid, the header body defining a middle region, an upper region, and a top extension;
   wherein:
      the upper region is oriented over the middle region relative to the vertical axis; and
      the top extension partially defines the fluid boundary and is oriented over the upper region; and
   an upper support structure disposed on the header body, the upper support structure comprising a branchwork of gussets rising upward and outward from a root point disposed in the middle region on the header body, the branchwork of gussets forming a plurality of top vanes, each supporting the top extension, the upper support structure defining an interior edge, and
   wherein:
      two adjacent top vanes define a vane spacing interval,
      the vane spacing interval is between 0.1-5 mm,
      the branchwork of gussets comprises a plurality of branches,
      two adjacent branches define a branch separation radius, and
      the branch separation radius is between 0.2-0.5 times the vane spacing interval.

2. The additively-manufactured heat exchanger header of claim 1, wherein:
   the interior edge defines an interior edge angle relative to the build plane;
   the interior edge angle is greater than 30 degrees;
   the branchwork of gussets comprises a plurality of branches;
   each of the plurality of branches defines a branch angle; and
   the branch angle is greater than 30 degrees.

3. The additively-manufactured heat exchanger header of claim 2, wherein:
   the interior edge angle is between 45-75 degrees; and
   the branch angle is between 45-75 degrees.

4. The additively-manufactured heat exchanger header of claim 1, wherein:
   each of the plurality of top vanes defines a vane thickness; and
   the vane thickness is between 0.5-5 mm.

5. The additively-manufactured heat exchanger header of claim 4, wherein the plurality of top vanes is configured to provide a heat sink for the top extension during an additive manufacturing process.

6. The additively-manufactured heat exchanger header of claim 1, wherein:
   each of the plurality of top vanes defines a vane thickness;
   the vane thickness is between 0.7-2 mm; and
   the vane spacing interval is between 1.5-3 mm.

7. The additively-manufactured heat exchanger header of claim 1, wherein each of the plurality of top vanes is parallel to the vertical axis.

8. The additively-manufactured heat exchanger header of claim 1, comprising nickel, aluminum, titanium, copper, iron, cobalt, and/or alloys thereof.

9. The additively-manufactured heat exchanger header of claim 8, comprising Inconel 625, Inconel 718, Haynes 282™, A205, A20X™, AlSi10Mg, or Aluminum 6061.

10. The additively-manufactured heat exchanger header of claim 1, wherein the branchwork of gussets comprises three or more generations of branches.

11. The additively-manufactured heat exchanger header of claim 1, further comprising:
   a bottom extension; and
   a lower region;
   wherein:
      the lower region is oriented under the middle region relative to the vertical axis;
      the bottom extension is oriented under the lower region; and
      the bottom extension partially defines the fluid boundary.

12. The additively-manufactured heat exchanger header of claim 1, further comprising one or more flow nozzles disposed on the header body, each of the one or more flow nozzles configured to port a working fluid into and/or out of the additively-manufactured heat exchanger header.

\* \* \* \* \*